(12) United States Patent
Hozumi et al.

(10) Patent No.: US 7,917,264 B2
(45) Date of Patent: Mar. 29, 2011

(54) SEAT APPARATUS FOR VEHICLE

(75) Inventors: Soichiro Hozumi, Nagoya (JP); Toshiro Maeda, Anjo (JP); Koji Aoki, Nagoya (JP); Koji Hattori, Toyota (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 707 days.

(21) Appl. No.: 11/934,975

(22) Filed: Nov. 5, 2007

(65) Prior Publication Data
US 2008/0109140 A1    May 8, 2008

(30) Foreign Application Priority Data
Nov. 6, 2006   (JP) ................................. 2006-300506

(51) Int. Cl.
*G05D 1/00*    (2006.01)
(52) U.S. Cl. ............ 701/49; 701/37; 701/38; 297/284.9
(58) Field of Classification Search .............. 701/49, 701/37, 38; 296/63, 65.01, 65.11, 65.12; 297/284.9
See application file for complete search history.

(56) References Cited

U.S. PATENT DOCUMENTS

| | | | | |
|---|---|---|---|---|
| 5,707,109 A | * | 1/1998 | Massara et al. | 297/284.9 |
| 6,037,731 A | * | 3/2000 | Fruehauf et al. | 318/468 |
| 6,720,750 B2 | * | 4/2004 | Stachowski et al. | 318/466 |
| 6,873,892 B2 | * | 3/2005 | Katz et al. | 701/49 |
| 7,480,562 B2 | * | 1/2009 | Kustosch | 701/205 |

FOREIGN PATENT DOCUMENTS

| | | | |
|---|---|---|---|
| JP | 2750943 B2 | | 2/1998 |
| JP | 2005-88834 | | 4/2005 |
| JP | 2005088834 A | * | 4/2005 |

OTHER PUBLICATIONS

U.S. Appl. No. 11/940,664, filed Nov. 15, 2007, Hozumi, et al.
U.S. Appl. No. 11/941,410, filed Nov. 16, 2007, Hozumi, et al.
U.S. Appl. No. 11/943,316, filed Nov. 20, 2007, Hozumi, et al.
U.S. Appl. No. 11/987,715, filed Dec. 4, 2007, Hozumi, et al.
U.S. Appl. No. 12/016,490, filed Jan. 18, 2008, Hozumi, et al.

\* cited by examiner

*Primary Examiner* — Thomas G Black
*Assistant Examiner* — Peter D Nolan
(74) *Attorney, Agent, or Firm* — Oblon, Spivak, McClelland, Maier & Neustadt, L.L.P.

(57) ABSTRACT

A seat apparatus for a vehicle having a side support portion that is controlled depending on a road condition, includes a distance calculating means for calculating a distance of a straight portion between a first curve, on which a vehicle is supposed to be driven, and a second curve, on which the vehicle is supposed to be driven after the first curve, based on an electronic map data, a first controlling level calculating means for calculating a first controlling level at which the side support portion is controlled when the vehicle is driven on the first curve, a second controlling level calculating means for calculating a second controlling level at which the side support portion is controlled when the vehicle is driven on the straight portion, and a driving means for operating the side support portion based on the first controlling level and the second controlling level.

3 Claims, 6 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2006-300506, filed on Nov. 6, 2006, the entire content of which are incorporated herein by reference.

FIELD OF THE INVENTION

The present invention relates to a seat apparatus for a vehicle that controls a side support portion depending on a road condition.

BACKGROUND

A seat apparatus for a vehicle disclosed in JP2750943 is well known. When the vehicle lateral accelerations are continuously detected, the seat apparatus determines that the vehicle is driven on a road having plural curves, such as a winding road, and then a supporting operation is executed. During the supporting operation, the seat apparatus is controlled in order to retain a side support portion to a position where a human body is supported thereby (hereinbelow, referred also to as a supporting position). According to the seat apparatus disclosed in JP2750943, the side support portion is retained to the supporting position without depending on an electronic map data. As a result, an occupant of the vehicle seat may not feel frequent actuations of the supporting operation.

However, because the seat apparatus disclosed in JP2705943 determines that the vehicle is driven on the winding road when the lateral acceleration is continuously generated at the vehicle, when the vehicle is driven on a winding road that has, for example, two curves including a straight portion therebetween, the seat apparatus may continuously retain the side support portion to the supporting position. As a result, even when the vehicle is driven on the straight portion between the curves where the occupant basically needs to be supported less firmly than on the curve, the occupant may still feel firmly pressured by the side support portion.

On the other hand, a vehicle controlling apparatus disclosed in JP2005088834A includes a suspension control device and a navigation device. The navigation device determines that the vehicle is driven on a winding road that has, for example, two curves (e.g., a first curve and a second curve) including a straight portion therebetween, based on electronic map data, and the suspension control device controls a suspension on the basis of the determination of the navigation device. In this configuration, even when the navigation device determines that the vehicle is driven on the straight portion, the suspension is controlled so as to be at a maximum controlling level of the first curve. In other words, according to the vehicle controlling device disclosed in JP2005088834A, when the straight portion exists between the two curves, because the navigation device determines that the vehicle is driven on the winding road based on the electronic map data, the suspension is continuously controlled during the entire winding road. In the light of this configuration, it is conceivable that a side support portion may be controlled in the same manner as the suspension is controlled by the vehicle controlling apparatus.

However, if the side support portion is controlled in the same manner as the suspension is controlled by the vehicle controlling apparatus, when the vehicle is driven on the straight portion of the winding road, because the side support portion is controlled so as to be at a maximum control level of the first curve, the occupant needs to be supported less firmly than when the vehicle is driven on the curve and thus may continuous pressure.

A need thus exists for a seat apparatus for a vehicle which is not susceptible to the drawback mentioned above.

SUMMARY OF THE INVENTION

According to an aspect of the present invention, a seat apparatus for a vehicle having a side support portion that is controlled depending on a road condition, includes a distance calculating means for calculating a distance of a straight portion of a road between a first curved portion, on which a vehicle is supposed to be driven, and a second curved portion, on which the vehicle is supposed to be driven following by the first curved portion, based on an electronic map data, a first controlling level calculate means for calculating a first controlling level at which the side support portion is controlled when the vehicle is driven on the first curved portion, a second controlling level calculating means for calculating a second controlling level at which the side support portion is controlled when the vehicle is driven on the straight portion, and a driving means for operating the side support portion based on the first controlling level and the second controlling level.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
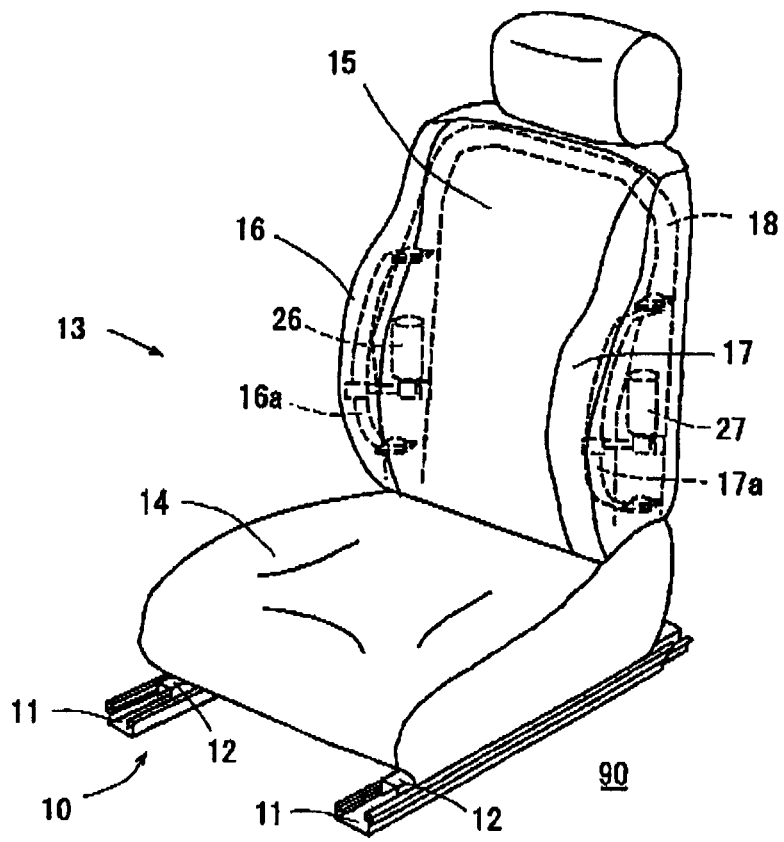
FIG. 1 is a perspective view of a seat apparatus for a vehicle.
Figure 2:
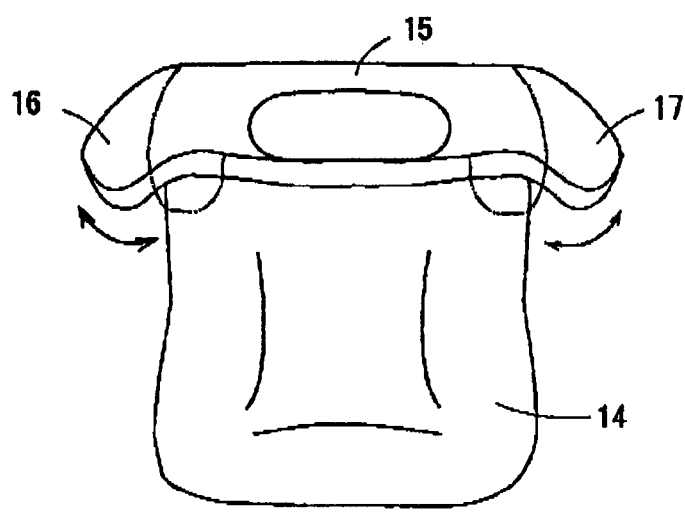
FIG. 2 is a plan view of the seat apparatus for the vehicle.

An embodiment of a seat apparatus for a vehicle (hereinafter referred to as a seat apparatus) related to the present invention will be described in accordance with the attached drawings. As illustrated in FIG. 1, the seat apparatus includes a seat slide device 10 and a seat 13. The seat slide device 10 includes, for example, a pair of lower rails 11 and a pair of upper rails 12 supported by the lower rails 11 so as to be slidable thereon. The lower rails 11 are fixed on a floor 90 so as to extend in a front-rear direction of the vehicle. Specifically, the seat 13 includes a seat cushion 14 on which an occupant is seated, and a seat back 15 that supports the occupant's back. Further, aright side support portion 16 and a left side support portion 17 are provided at a right and a left portions of the seat back 15 respectively for stabilizing a posture of the occupant by pressing the upper body of the occupant on its sides. Additionally, a right motor 26 and a left motor 27 are provided at a right and a left portions of a seat frame 18 respectively. Each of the right and the left motors 26 and 27 includes a reduction mechanism. Furthermore, a right support frame 16a and a left support frame 17a are adapted to be pivoted by means of the right and the left motors 26 and 27 respectively. Both right and left support frames 16a and 17a are pivoted by both right and left motors 26 and 27 being driven, and therefore both right and left side support portions 16 and 17 are moved to be in an opened position, which is indicated with a solid line, and to be in a closed position, which is indicated with a chain double-dashed line illustrated in FIG. 2. The right side support portion 16 and the left side support portion 17 each serves as a side support portion. The right motor 26 and a motor 27 each serves as a part of a driving means.

Figure 3:
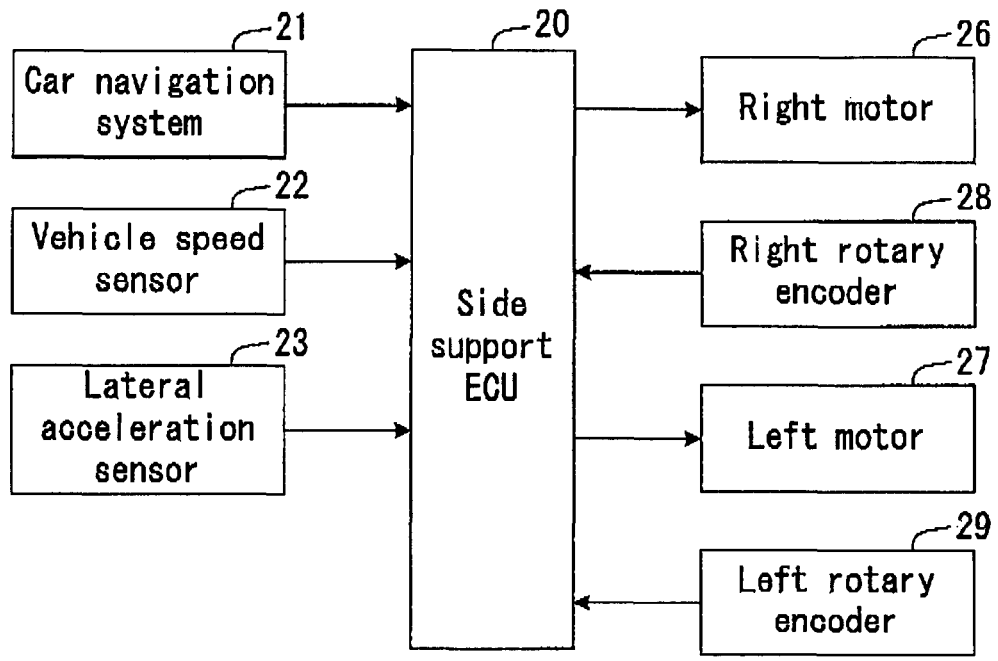
FIG. 3 illustrates an electric connection of the seat apparatus.

FIG. 3 is a chart illustrating electric connections of the seat apparatus. As illustrated in FIG. 3, a vehicle speed sensor 22 and a lateral acceleration sensor 23 are connected to a side support electronic control unit 20 (hereinafter referred to as a side support ECU 20). The lateral acceleration sensor 23 detects acceleration generated at the vehicle in a lateral direction thereof when the vehicle turns the curve. In this configuration, a detecting signal detected by each of the vehicle speed sensor 22 and the lateral acceleration sensor 23 is inputted to the side support ECU 20. Additionally, a car navigation system 21 is connected to the side support ECU 20, and data such as a location of the vehicle, a moving direction of the vehicle, electronic map data and the like are successively inputted to the side support ECU 20 from the car navigation system 21. The electronic map data includes information on a radius of a curve located at a predetermined distance ahead in a moving direction of the vehicle. Furthermore, the right motor 26, the left motor 27, a right rotary encoder 28 and a left rotary encoder 29 are connected to the side support ECU 20. The side support motor ECU 20 outputs driving signals to the right and the left motor 26 and 27. Further, the right and the left rotary encoders 28 and 29 output location signals (feedback signals) for successively feeding back positions of the side support portions 16 and 17 until the side support portions 16 and 17 are retained to a target closing position.

Figure 4:
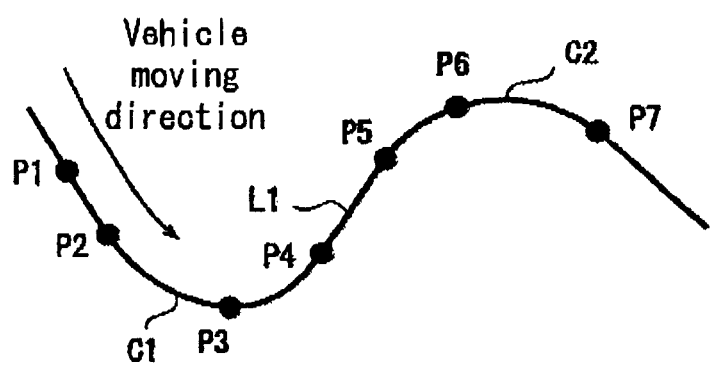
FIG. 4 is a diagram illustrating a road on which the vehicle is driven.

The vehicle having the seat apparatus that is structured as mentioned above is assumed to move on a road in a direction indicated with an arrow illustrated in FIG. 4. In FIG. 4, C1 indicates a first curve (a first curved portion), and C2 indicates a second curve (a second curved portion). That is to say, a curve which the vehicle reaches first is indicated as the first curve C1, and a curve which the vehicle reaches secondly is indicated as the second curve C2. Furthermore, P2 indicates a starting point of the first curve C1, P3 indicates a point at which the first curve C1 has a minimum radius (hereinafter referred to as a minimum radius point P3), P4 indicates an ending point of the first curve C1, P5 indicates a starting point of the second curve C2, P6 indicates a point at which the second curve C2 has a minimum radius (hereinafter referred to as a minimum radius point P6), and P7 indicates an ending point of the second curve C2. Additionally, L1 indicates a substantially straight portion on the road (hereinafter referred to as a straight portion L1). The straight portion L1 starts from the ending point P4 of the first curve C1 to the starting point P5 of the second curve C2. P1 indicates a point at which the control starts (hereinafter referred to as a control starting point P1). The control starting point P1 is positioned two seconds before the starting point P2 on the first curve C1. In addition, the vehicle is assumed not to reach the control starting point P1 before the side support ECU 20 executes the side support control on the side support portions 16 and 17.

Figure 5:
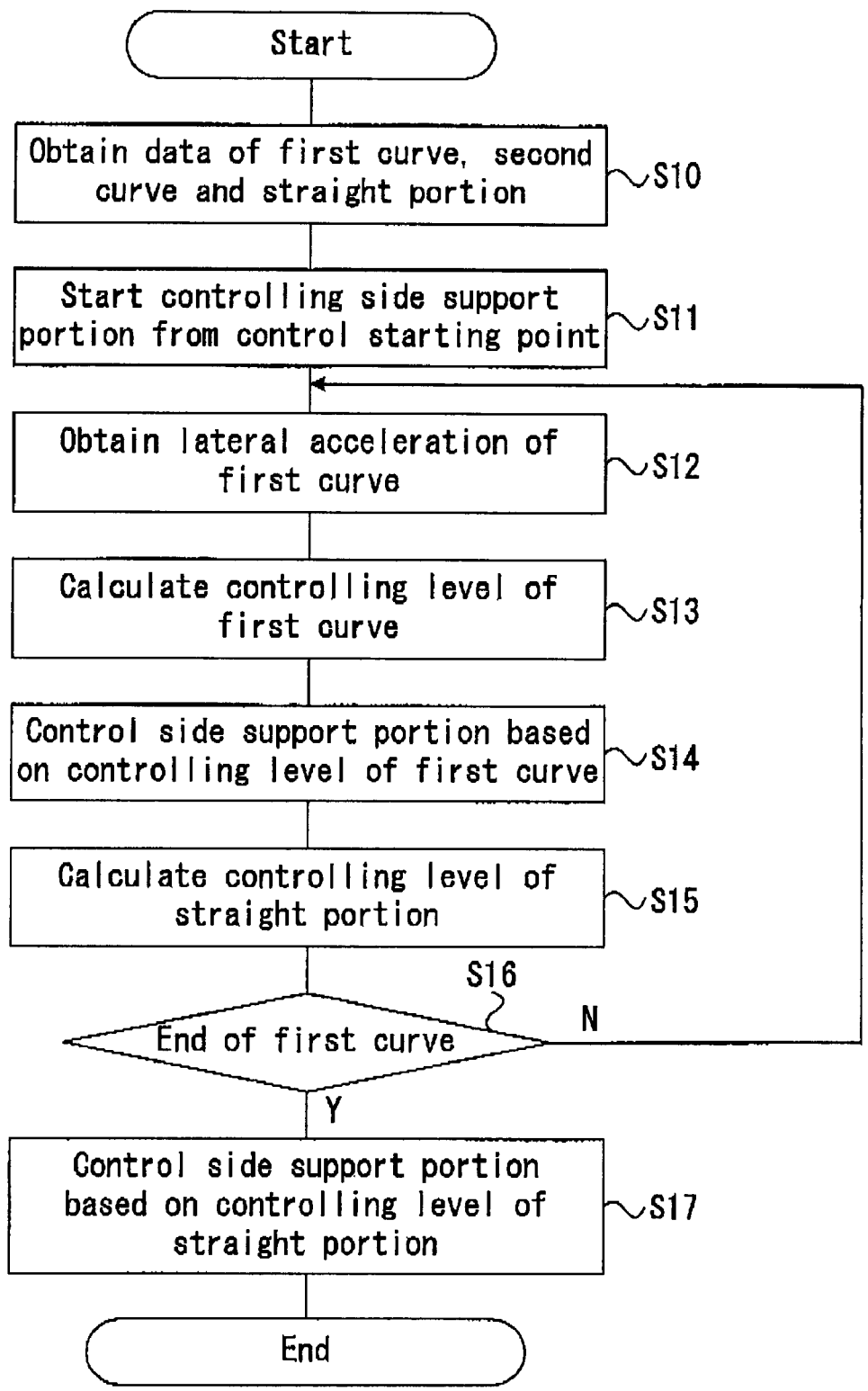
FIG. 5 is a flow chart of a side support controlling program.

Control of the side support portion provided at the seat apparatus will be described in accordance with FIG. 5, in which a flow chart of a side support controlling program is described. When the side support controlling program is executed, firstly, the side support ECU 20 obtains data of the first curve C1, the second curve C2 and the straight portion L1 and the like from the car navigation system 21 in step S10. In particular, the side support ECU 20 sequentially receives information on a radius of a curve, which is located at a predetermined distance ahead of the moving direction of the vehicle, from the car navigation system 21. Therefore, for example, when the vehicle moves to a predetermined distance before the ending point P7 of the second curve C2, the side support ECU 20 gains information of the curve radius and the like up to the ending point P7 of the second curve C2. The side support ECU 20 calculates the control starting point P1, the starting point P2 of the first curve C1, the minimum radius point P3 of the first curve C1, the curve radius of the first curve C1, the ending point P4, the starting point P5 of the second curve C2, the minimum radius point P6 of the second curve C2, the curve radius of the second curve C2, the ending point P7 and a distance 1 of the straight portion L1 based on the information received by the side support ECU 20 in the above-mentioned manner. The step S10 is a distance calculating means.

Figure 6:
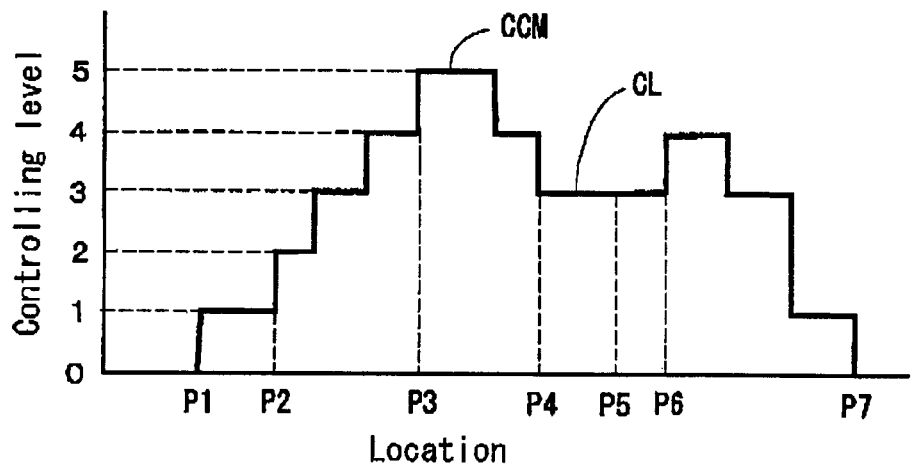
FIG. 6 is a graph showing controlling level of a side support portion when a straight portion extends a distance of 51 to 150 meters.

As illustrated in FIG. 6, the side support ECU 20 starts controlling the right and left side support portions 16 and 17 in step S11 when the vehicle reaches the control starting point P1. The control starting point P1 is positioned two seconds before the starting point P2 of the first curve C1. Furthermore, the driving signals are inputted to the right and the left motors 26 and 27 from the side support ECU 20, and the feedback signals are inputted to the side support ECU 20 from the right and the left rotary encoders 28 and 29 in order to control the right and the left side support portions 16 and 17 so as to be moved to the opening and the closing positions. Hence, because the side support ECU 20 starts controlling the right and the left side support portions 16 and 17 at the control starting point P1, the right and the left side support portions 16 and 17 are prevented from being suddenly moved to a closed position, so that the occupant may not feel sudden supporting operation. Additionally, as illustrated in FIG. 6, a controlling level of each side support portion 16 and 17 includes six levels, from level 0 to level 5. However, the controlling level of the right and the left sides support portions 16 and 17 does not need to include six levels, but the controlling level may include any appropriate levels if needed.

The side support ECU 20 obtains a lateral acceleration value on the first curve C1 in step S12. Specifically, the lateral acceleration value is an output value from the lateral acceleration sensor 23 obtained when the vehicle is driven on the first curve C1. A controlling level when the vehicle turns the curve (hereinafter refereed to as a controlling level on the curve), which corresponds to the controlling level of the right and the left side support portions 16 and 17 of the first curve C1, is calculated in step S13 by the side support ECU 20 based on the lateral acceleration value. However, the controlling level of the right and the left side support portions 16 and 17 within a distance from the starting point P2 of the first curve C1 to the minimum radius point P3 is determined only on the basis of the lateral acceleration value. On the other hand, the controlling value of the right and the left side support portions 16 and 17 within a distance from the minimum radius point P3 to the ending point P4 on the first curve C1 is determined on the basis of the lateral acceleration value and a controlling level of the side support portion when the vehicle is driven on the straight portion (hereinafter referred to as straight portion controlling level CL), which will be described in detail below. In other words, the controlling level of the right and the left side support portions 16 and 17 within a distance from the minimum radius point P3 to the ending point P4 on the first curve C1 is determined so as not to be lower than the straight portion controlling level CL, considering the lateral acceleration value. The step S13 serves a controlling level calculating means (a first controlling level calculating means) for calculating a controlling level (a first controlling level) of the side support portion when the vehicle is driven on the curve.

As illustrated in FIG. 6, in step S14, within a distance from the starting point P2 to the ending point P4 on the first curve C1, the right and the left side support portions 16 and 17 are controlled by the side support ECU 20 based on the calculated controlling level on the curve. The right and the left side support portions 16 and 17 are operated by outputting the driving signals to the right and the left motors 26 and 27 from the side support ECU 20 and by inputting the feedback signals to the side support ECU 20 from the right and the left rotary encoders 28 and 29. The steps S14 and S17, which will be described below, serve as a part of a driving means.

The straight portion controlling level CL of the straight portion L1 is calculated within a distance from the starting point P2 on the first curve C1 to the minimum radius point P3 in step S15. Specifically, each time when the step S15 is executed, a latest straight portion controlling level CL is calculated based on the controlling level of each curve, and the side support ECU 20 compares the latest straight portion controlling level CL to the memorized straight portion controlling level CL. Then the side support ECU 20 determines a larger calculated value as the straight portion controlling level CL. In the above-mentioned manner, the calculated value corresponding to a maximum controlling level on the curve CCM is determined as the straight portion controlling level CL before the vehicle reaches the minimum radius point P3. Therefore, the calculated value corresponding to the lateral acceleration value on the minimum radius point P3 may be or may not be determined as the straight portion controlling level CL. The step S15 serves as a controlling level calculating means (a second controlling level calculating means) for calculating a controlling level (a second controlling level) of the side support portion when the vehicle is driven on the straight portion.

The straight portion controlling level CL is obtained by multiplying the controlling level on the curve by a supporting rate α indicated in Table 1. In this regard, however, the calculated level is rounded to the nearest whole number.

TABLE 1

| Distance of the straight portion | Supporting rate α |
|---|---|
| 50 or less than 50 m | 1 |
| 51 m to 150 m | 0.5 |
| Equal to or more than 151 m | 0 |

A graph illustrated in FIG. 6 indicates the straight portion controlling level CL in the circumstances where the vehicle is driven on the straight portion L1 extending from 51 to 150 meters, the supporting rate α is set to 0.5, and the controlling level of a maximum curve CCM is set to level 5. Hence, the controlling level of the maximum curve CCM straight portion CL is calculated by multiplying the controlling level of the maximum curve CCM 5 by the supporting rate a 0.5. In this regard, however, the calculated the straight portion controlling level CL is rounded up if the next digit (after the decimal point) is 5 or more, and rounded down if the next digit (after the decimal point) is 4 or less. Consequently, in step S17 described below, the right and the left side support portions 16 and 17 are controlled to support the human body at the level 3 of the straight portion controlling level CL while the vehicle is driven on the straight portion L1.

Figure 7:
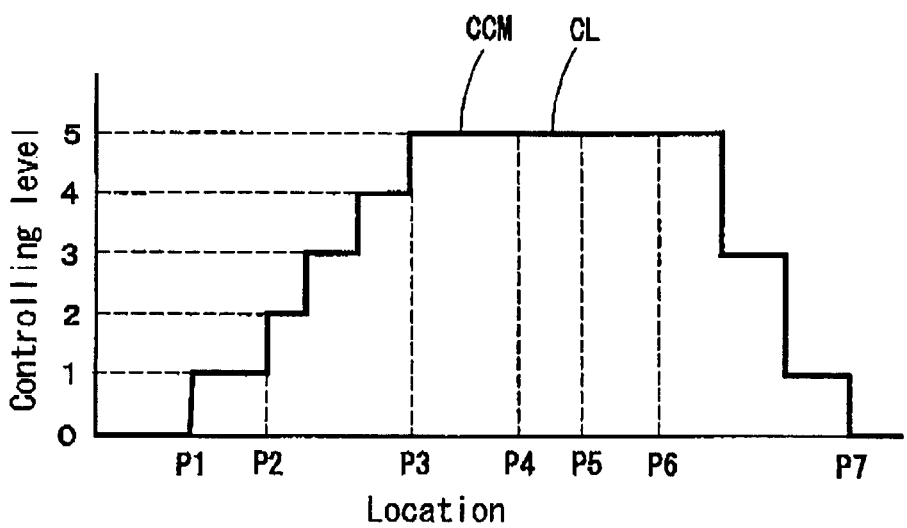
FIG. 7 is a graph showing the controlling level of the side support portion when the straight portion extends equal to or less than 50 meters.

A graph illustrated in FIG. 7 indicates the straight portion controlling level CL in the circumstances where the vehicle is driven on the straight portion L1 extending equal to or less than 50 meters, the supporting rate α is 1, and the controlling level of the maximum curve CCM is set to level 5. Hence, the controlling level of the maximum curve CCM straight portion CL is level 5, which is calculated by multiplying the controlling level of the maximum curve CCM 5 by the supporting rate a 1. Consequently, in the step S17 described below, the right and the left side support portions 16 and 17 are controlled to support the human body at the level 5 of the straight portion controlling level CL while the vehicle is on the straight portion L1.

Figure 8:
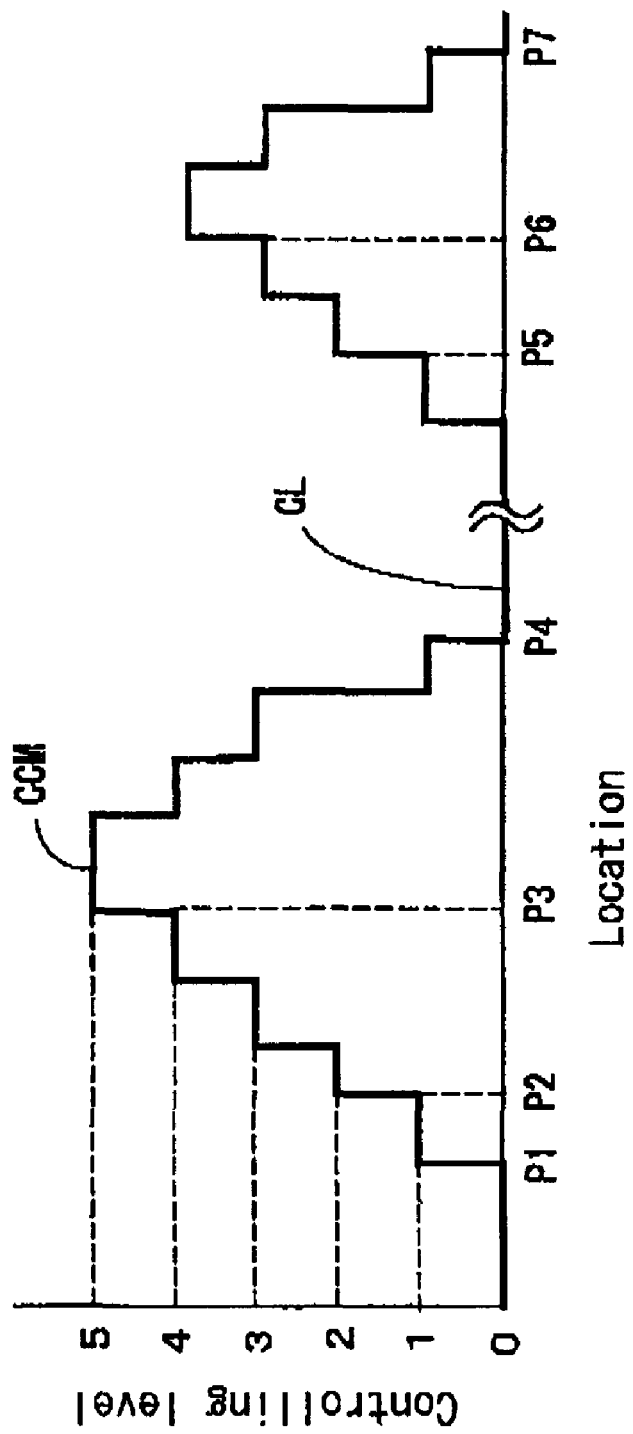
FIG. 8 is a graph showing the controlling level of the side support portion when the straight portion extends equal to or more than 151 meters.

A graph illustrated in FIG. 8 indicates the straight portion controlling level CL in the circumstances where the vehicle is driven on the straight portion L1 extending equal to or more than 151 meters, the supporting rate α is set to 0, and the controlling level of the maximum curve CCM is set to level 5. Hence, the controlling level of the maximum curve CCM straight portion CL is level 0, which is calculated by multiplying the controlling level of the maximum curve CCM 5 by the supporting rate a 0. Consequently, in the step S17 described below, the right and the left side support portions 16 and 17 are retained to positions so as to support the human body at the level 0 of the straight portion controlling level CL while the vehicle is driven on the straight portion L1.

Then, the side support ECU 20 checks the end of the first curve C1 in step S16. Specifically, if the vehicle has reached the ending point P4 of the first curve C1 (YES), the side support ECU 20 determines that the vehicle passes the first curve C1 and then proceeds to the next step S17. On the other hand, if the ECU 20 determines that the vehicle has not reach the ending point P4 of the first curve C1 (NO), the side support ECU 20 determines that the vehicle has not passed the first curve C1 and then returns to the step S12.

in the step S17, the vehicle is driven on the straight portion L1, and the right and the left side support portions 16 and 17 are controlled to retain to the positions so as to support the human body based on the controlling level of the straight portion CL. Further, in the step S17, the side support controlling program is terminated. The step S17 functions as a part of the driving means together with the step S14.

Figure 9:
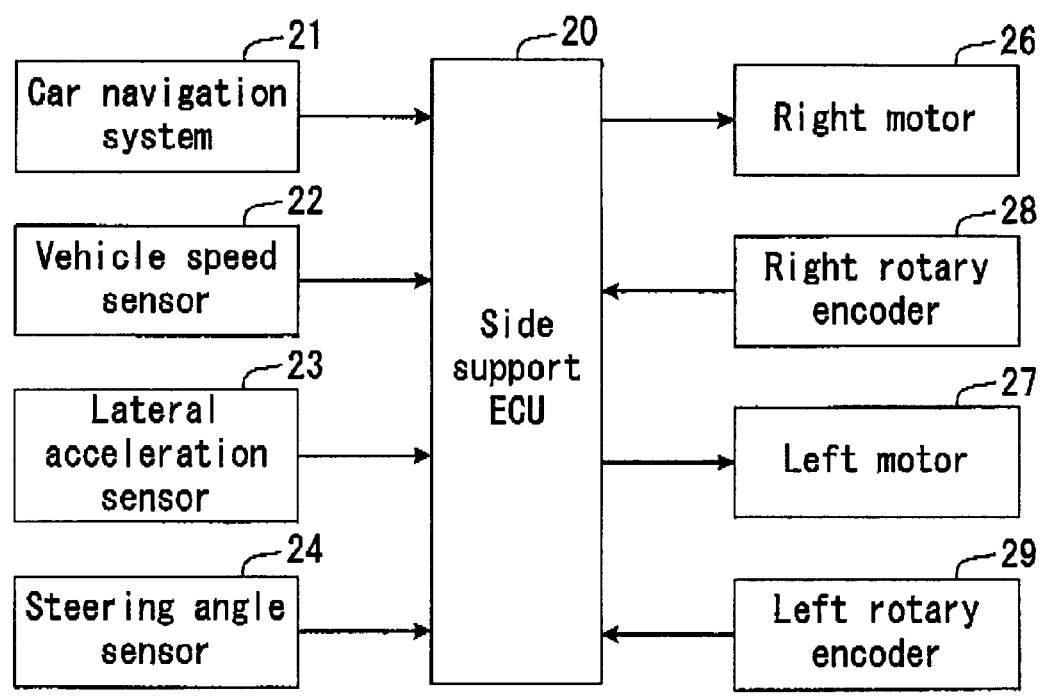
FIG. 9 illustrates a modified electric connection of the seat apparatus.

In this embodiment, the controlling level on the curve is calculated based on the outputted value of the lateral acceleration sensor 23. However, the controlling level on the curve may be calculated based on the lateral acceleration value, which is calculated based on an outputted value of a steering angle sensor 24, which is connected to the side support ECU 20 as illustrated in FIG. 9, and the outputted value of the vehicle speed sensor 22. Additionally, the controlling level on the curve may be calculated based on the lateral acceleration value, which is calculated by estimating lateral acceleration values on each point on the curves C1 and C2 based on the electronic map data inputted from the car navigation system 21 and the outputted value of the vehicle speed sensor 22.

According to the embodiment, when the vehicle driven on the straight portion L1 existing between the first curve C1 and the second curve C2, the right and the left side support portions 16 and 17 are controlled to support the human body at the straight portion controlling level CL, which is calculated on the basis of the distance of the straight portion L1 and the controlling level of the first curve C1. Hence, the right and the left side support portions are prevented from being frequently operated to support the human body. Additionally, the right and the left side support portions 16 and 17 are not always retained to the maximum controlling level, to which the side support portions 16 and 17 are retained when the vehicle is driven on the first curve C1. Hence, according to the embodiment, when the vehicle is driven on the winding road, the side support portion is controlled so as not to be frequently operated each time the vehicle turns a curve. As a result, the occupant may feel less pressed.

According to the embodiment, the controlling level of the side support portions 16 and 17 when the vehicle is driven on the first curve C1 is calculated by the controlling level calculating means on the basis of the outputted value outputted of the lateral acceleration sensor 23, which detects acceleration generated at the vehicle in the lateral direction thereof, and controlling level of the side support portions 16 and 17 when the vehicle is driven on the straight portion L1 is calculated by the controlling level calculating means by multiplying the maximum controlling level of the side support portion 16 and 17 when the vehicle is driven on the first curve C1 by supporting rate a that increases in inverse proportion to the distance of the straight portion L1.

Accordingly, the controlling level of the side support portion when the vehicle is driven on the first curve C1 is calculated based on the outputted value of the lateral acceleration sensor 23, in other words, the controlling level on the curve is calculated based on the lateral acceleration that is actually applied to the occupants. Additionally, the controlling level of the straight portion is calculated by multiplying the maximum controlling level on the curve CCM by the supporting rate α, which increases as the distance of the straight portion L1 decreases. Hence, the shorter the straight portion L1 becomes, the more securely the right and the left side supports 16 and 17 support the human body. As a result, the right and the left side supports 16 and 17 securely support the human body to hold a stable posture.

According to the embodiment the curve controlling level of the side support portions 16 and 17 when the vehicle is driven on the first curve C1 is calculated by the controlling level calculating means on the basis of a value outputted from a steering angle sensor 24 and a value outputted from a vehicle speed sensor 22, and the straight portion controlling level of the side support portion 16 and 17 when the vehicle is driven on the straight portion L1 is calculated by the straight portion controlling level calculating means by multiplying the maximum controlling level of the side support portions 16 and 17 when the vehicle is driven on the first curve C1 by supporting rate α, which increases in inverse proportion to the distance of the straight portion L1.

Accordingly, the controlling level on the curve is calculated based on the lateral acceleration value, which is calculated on the basis of the outputted value of the steering angle sensor 24 and the outputted value of the vehicle speed sensor 22. Therefore, the controlling level on the curve is calculated without using the outputted value of the lateral acceleration sensor 23. Additionally, the straight portion controlling level CL is calculated by multiplying the maximum controlling level on the curve by the supporting rate α, which increases as the distance of the straight portion L1 decreases. Therefore, the shorter the straight portion L1 becomes, the more securely the right and the left side supports 16 and 17 support the human body. As a result the right and the left side supports 16 and 17 securely support the human body to hold a stable posture.

According to the embodiment, the curve controlling level of the side support portions 16 and 17 when the vehicle is driven on the first curve C1 is calculated by the controlling level calculating means on the basis of a lateral acceleration value that is calculated on the basis of the electronic map data and a value outputted from a vehicle speed sensor 22, and the straight portion controlling level of the side support portions 16 and 17 when the vehicle is driven on the straight portion L1 is calculated by the controlling level calculating means of the straight portion by multiplying the maximum controlling level of the side support portions 16 and 17 when the vehicle is driven on the first curve C1 by supporting rate a that increases in inverse proportion to the distance of the straight portion L1.

Accordingly, the controlling level on the curve is calculated based on the lateral acceleration value, which is estimated on the basis of the electronic map data and the outputted value of the vehicle sped sensor 22. Hence, the controlling level on the curve may be calculated without using the outputted value of the lateral acceleration sensor 23. Additionally, the straight portion controlling level CL is calculated by multiplying the maximum controlling level on the curve by the supporting rate α, which increases as the distance of the straight portion L1 decreases. Therefore, the shorter the straight portion L1 becomes, the more securely the right and the left side supports 16 and 17 support the human body. As a result, the right and the left side supports 16 and 17 securely support the human body to hold a stable posture.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather tan restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle for controlling a side support portion depending on a road condition, comprising:
a linear distance calculating means for calculating a linear distance of a straight portion between a first curve, on which a vehicle travels first, and a second curve, on which the vehicle travels following the first curve, based on an electronic map data;
a curve controlling level calculating means for calculating a curve controlling level, which corresponds to a controlling level for the side support portion at the first curve;
a linear portion controlling level calculating means for calculating a linear portion controlling level, which corresponds to a controlling level for the side support portion on the straight portion, on the basis of the linear distance and the curve controlling level; and
a driving means for driving the side support portion based on the curve controlling level and the linear portion controlling level,
wherein the curve controlling level is calculated at the curve controlling level calculating means from an output value of a lateral acceleration sensor, and the linear portion controlling level is calculated at the linear portion controlling level calculating means by multiplying a maximum curve controlling level out of a plurality of curve controlling levels calculated by the curve controlling calculating means at the first curve by a supporting rate that becomes greater as the linear distance becomes shorter.

2. A seat apparatus for a vehicle for controlling a side support portion depending on a road condition, comprising:
a linear distance calculating means for calculating a linear distance of a straight portion between a first curve, on which a vehicle travels first, and a second curve, on which the vehicle travels following the first curve, based on an electronic map data;
a curve controlling level calculating means for calculating a curve controlling level, which corresponds to a controlling level for the side support portion at the first curve;
a linear portion controlling level calculating means for calculating a linear portion controlling level, which corresponds to a controlling level for the side support portion on the straight portion, on the basis of the linear distance and the curve controlling level; and
a driving means for driving the side support portion based on the curve controlling level and the linear portion controlling level,
wherein the curve controlling level is calculated at the curve controlling level calculating means from an output value of a steering angle sensor and an output value of a vehicle speed sensor, and the linear portion controlling level is calculated at the linear portion controlling level calculating means by multiplying a maximum curve controlling level out of a plurality of curve controlling levels calculated by the curve controlling calculating means at the first curve by a supporting rate, which becomes greater as the linear distance becomes shorter.

3. A seat apparatus for a vehicle for controlling a side support portion depending on a road condition, comprising:
a linear distance calculating means for calculating a linear distance of a straight portion between a first curve, on which a vehicle travels first, and a second curve, on which the vehicle travels following the first curve, based on an electronic map data;
a curve controlling level calculating means for calculating a curve controlling level, which corresponds to a controlling level for the side support portion at the first curve;
a linear portion controlling level calculating means for calculating a linear portion controlling level, which corresponds to a controlling level for the side support portion on the straight portion, on the basis of the linear distance and the curve controlling level; and
a driving means for driving the side support portion based on the curve controlling level and the linear portion controlling level,
wherein the curve controlling level is calculated at the curve controlling level calculating means on the basis of a lateral acceleration value that is calculated from the electronic map data and an output value of a vehicle speed sensor, and the linear portion controlling level is calculated at the linear portion controlling level calculating means by multiplying a maximum curve controlling level out of a plurality of curve controlling levels calculated by the curve controlling calculating means at the first curve by a supporting rate that becomes greater as the linear distance becomes shorter.

* * * * *